US011002565B2

(12) United States Patent
Welsch et al.

(10) Patent No.: US 11,002,565 B2
(45) Date of Patent: May 11, 2021

(54) PATH SENSOR (71) Applicant: Robert Bosch GmbH, Stuttgart (DE)

(72) Inventors: Wolfgang Welsch, Heidelberg (DE); Michael Kleinknecht, Lehrensteinsfeld (DE); Mathias Kimmerle, Steinheim (DE); Sina Fella, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 60 days.

(21) Appl. No.: 16/473,199

(22) PCT Filed: Dec. 28, 2017

(86) PCT No.: PCT/EP2017/084685
§ 371 (c)(1),
(2) Date: Jun. 24, 2019

(87) PCT Pub. No.: WO2018/122286
PCT Pub. Date: Jul. 5, 2018

(65) Prior Publication Data
US 2020/0096366 A1 Mar. 26, 2020

(30) Foreign Application Priority Data

Dec. 29, 2016 (DE) ...................... 10 2016 226 301.3
Dec. 13, 2017 (DE) ...................... 10 2017 222 676.5

(51) Int. Cl.
*G01D 5/14* (2006.01)
*H02K 15/08* (2006.01)

(52) U.S. Cl.
CPC ............. *G01D 5/145* (2013.01); *H02K 15/08* (2013.01)

(58) Field of Classification Search
None
See application file for complete search history.

(56) References Cited

U.S. PATENT DOCUMENTS 6,313,625 B1 * 11/2001 Varady ................ G01D 5/2013
324/173
6,545,463 B1 * 4/2003 Dettmann ............ G01D 5/145
324/207.21
(Continued)

FOREIGN PATENT DOCUMENTS

DE 43 11 955 A1 10/1994
DE 199 10 636 A1 9/2000
(Continued)

OTHER PUBLICATIONS

International Search Report corresponding to PCT Application No. PCT/EP2017/084685, dated Mar. 14, 2018 (German and English language document) (7 pages).

*Primary Examiner* — Jas A Sanghera
(74) *Attorney, Agent, or Firm* — Maginot, Moore & Beck LLP (57) ABSTRACT

A path sensor includes: a sensing device; at least two sensor units assigned to the sensing device, wherein the sensing device can be displaced relative to the sensor units and has a property changing at least once from a starting value to an end value along the sensing device, which property can be detected by the sensor units; and an evaluation unit, which is designed to determine the position of the sensing device relative to the sensor units as a function of the property values detected by the sensor units. The sensing device has at least two sections following on from one another in the direction of movement, along which sections the property changes from at least the starting value to at least the end value, wherein the change has different gradients in the sections.

9 Claims, 5 Drawing Sheets (56) References Cited

U.S. PATENT DOCUMENTS

2009/0174396 A1    7/2009  Howard
2009/0278711 A1*  11/2009  Lohberg .................. G01P 3/487
                                                                    341/11

FOREIGN PATENT DOCUMENTS

| | | |
|---|---|---|
| DE | 102 31 980 A1 | 2/2004 |
| DE | 10 2006 057 362 A1 | 6/2008 |
| DE | 112013006754 T5 | 12/2015 |
| EP | 1 595 114 B1 | 11/2005 |
| GB | 2506698 A | 4/2014 |
| JP | S61-281902 A | 12/1986 |
| JP | S61-281903 A | 12/1986 |
| JP | S61-292502 A | 12/1986 |
| JP | H09-210611 A | 8/1997 |

* cited by examiner

PATH SENSOR

This application is a 35 U.S.C. § 371 National Stage Application of PCT/EP2017/084685, filed on Dec. 28, 2017, which claims the benefit of priority to Serial No. DE 10 2016 226 301.3, filed on Dec. 29, 2016 in Germany, and to Serial No. DE 10 2017 222 676.5, filed on Dec. 13, 2017 in Germany, the disclosures of which are incorporated herein by reference in their entirety.

The disclosure relates to a path sensor, comprising a measurement value transducer and comprising at least two sensor units assigned to the measurement value transducer, wherein the measurement value transducer is displaceable relative to the sensor units and has a property which changes along the measurement value transducer and which is detectable by the sensor units, and comprising an evaluation device configured to determine the location of the measurement value transducer in relation to the sensor units depending on the property values detected by the sensor units.

Furthermore, the disclosure relates to a method for operating the path sensor described above.

BACKGROUND

In order to monitor or detect a linear movement or a rotational movement and/or a path distance covered in the process, it is known to use magnetically, inductively or capacitively operating sensor devices. The latter each have a measurement value transducer fixedly connected to the element whose location or position is to be detected, and also one or more sensor units which monitor the position or location of the measurement value transducer magnetically, inductively or capacitively. Since the measurement value transducer has a property which changes in the direction of movement or displacement direction, an unambiguous position of the measurement value transducer is able to be established by means of the sensor units provided that the property changes along the movement path in such a way that each property value of the property occurs only once. A simple detection of the location of the measurement value transducer and thus of the device to be monitored is ensured as a result.

What is disadvantageous about the known path sensors is that the movement range of the measurement value transducer is limited on account of the requirement of the unique property value.

SUMMARY

The path sensor according to the disclosure having the features described herein has the advantage that the measurement path or the movement path to be detected of the measurement value transducer can be lengthened significantly by comparison with known solutions. For this purpose, the disclosure provides for the measurement value transducer to comprise at least two sections in succession in the direction of movement, along which the property changes in each case from at least the starting value to at least the end value, wherein the change in the sections has different gradients. As already explained above, the property to be detected changes from a starting value to an end value in the direction of movement of the measurement value transducer. The property thus has a gradient as a result of the change, which gradient is detectable by the sensor units. The gradient of the change results from the change in the property per unit distance of the path along the measurement value transducer (as viewed in the direction of movement of the measurement value transducer). This results in a characteristic curve (property value versus longitudinal extent of the measurement value transducer) reflecting said gradient, said characteristic curve being detectable by the path sensor. By taking into account or ascertaining the present gradient, what is achieved is that it is possible to differentiate between a plurality of sections of the measurement value transducer in the direction of movement. By virtue of the fact that the measurement value transducer has different gradients of the property in the direction of movement, the exact position or location at which the measurement value transducer is situated is able to be ascertained depending on the currently detected gradient and the currently detected property value, even if the respective property value occurs repeatedly in the overall extent of the measurement value transducer. A prerequisite for this is that a property value which occurs repeatedly along the direction of movement of the measurement value transducer lies in sections of the measurement value transducer which have different gradients, such that an unambiguous assignment of a detected property value to a gradient and thus of a section of the measurement value transducer is ensured. Consequently, the path sensor according to the disclosure allows a plurality of sections to be present on the measurement value transducer, within which sections the property changes differently, wherein a property value can respectively occur once in each section. Thus, along the respective section, for example, the property can always change identically, that is to say from the same initial value to the same end value, but over a path distance of varying length, such that a different gradient of the change in the property is present. Preferably, the sections each have the same starting values and the same end values, such that the property changes in a repeating manner. Alternatively, however, starting and/or end values can also deviate from one another. In any case, on account of the different gradients, overlapping value ranges of adjacent sections are made possible which can be differentiated from one another by virtue of the different gradient.

In accordance with one preferred embodiment of the disclosure, provision is additionally made for the property not to change in at least one section of the measurement value transducer situated in the direction of movement. This gives rise to a so-called clamping region, within which the sensor value of the path sensor does not change. The clamping region can lie for example at an end of the measurement value transducer or for example between two sections having different gradients.

Furthermore, provision is preferably made for the sensor units of the path sensor to be arranged in succession as viewed in the direction of movement of the measurement value transducer. As a result, a simple and reliable detection of the gradient by means of the sensor units is reliably ensured for example even when the measurement value transducer is at a standstill.

Preferably, the measurement value transducer has as property a magnetic field having an orientation that changes in the direction of movement of the measurement valve transducer, wherein the sensor units are configured for detecting the magnetic field orientation. The varying magnetic field is thereby utilized as the property of the measurement value transducer to determine magnetically the location of the measurement value transducer relative to the sensor units. Magnetically operating path sensors are known, in principle, and so it is possible to have recourse to known technologies here. In contrast to known solutions, merely in addition to the actual property value the gradient of the change in the orientation of the magnetic field is also detected and concomitantly evaluated in order to ensure an unambiguous position determination of the measurement value transducer, as described above.

In accordance with a first embodiment, the measurement value transducer is preferably mounted displaceably, such that the path sensor is realized as a linear path sensor.

Alternatively, the measurement value transducer is mounted rotatably, thus resulting in a rotation sensor suitable for detecting angles of rotation, for example.

In accordance with one preferred embodiment, the measurement value transducer has an in particular helically magnetized permanent magnet. This results in an integral measurement value transducer, which is simple to handle and to mount.

Alternatively, the measurement value transducer preferably has a plurality of permanent magnets bearing against one another in the direction of movement. As a result, a plurality of sections having different gradients of the changing magnetic field orientation are able to be realized, in particular in that permanent magnets having different longitudinal extents, as viewed in the direction of movement, are used.

In accordance with one alternative embodiment of the disclosure, provision is preferably made for the sensor units each to have at least one induction coil, and for the metallically configured measurement value transducer to have as property a width that changes in the direction of movement. As a result of this embodiment, an inductive detection of the location of the measurement value transducer is achieved. Here, too, a plurality of sections are provided along the measurement value transducer, said sections having a different gradient of the change in width (property), thereby ensuring an unambiguous determination of the position of the measurement value transducer.

In accordance with a further alternative embodiment, provision is preferably made for the sensor units to be configured as capacitive sensor units and for the metallically configured measurement value transducer to have as property a width that changes in the direction of movement. In this case, however, a capacitive measurement principle is realized instead of an inductive measurement principle. As a result, this affords the advantages already mentioned above for detecting the unambiguous position of the measurement value transducer and the possibility of realizing particularly large measurement paths.

The method according to the disclosure having the features described herein is distinguished by the fact that, by means of the sensor units, in each case a property value of the property is detected and a gradient of the change in the property is determined in particular depending on the detected property values along the measurement value transducer, wherein, as viewed in the direction of movement, the measurement value transducer has at least two sections in succession within which the gradients of the change are different, and wherein the position of the measurement value transducer relative to the sensor units is determined depending on the detected property values and the ascertained gradient. This affords the advantages already mentioned above.

In particular, provision is made for the property to be ascertained magnetically, inductively or capacitively. One of the variants can prove to be advantageous depending on the application and boundary conditions. Preferably, the position of the measurement value transducer is detected in absolute fashion and/or by means of a differential measurement. In the case of the absolute measurement, a property value is detected which already determines the output variable of the sensor unit. In the case of a differential measurement, by contrast, the same measurement variable is detected by two sensors or sensor units at two different locations, with the result that different property values can arise. The detected property values are then subtracted from one another (difference formation) and only then converted into the output variable of the sensor unit or the path sensor. By virtue of this principle, the path sensor is particularly robust vis-à-vis disturbance fields or homogeneous disturbances of the measurement variable, since these do not influence the output variable on account of the difference formation.

BRIEF DESCRIPTION OF THE DRAWINGS

The disclosure will be explained in greater detail below with reference to the drawing. In this respect.

DETAILED DESCRIPTION

Figure 1A:
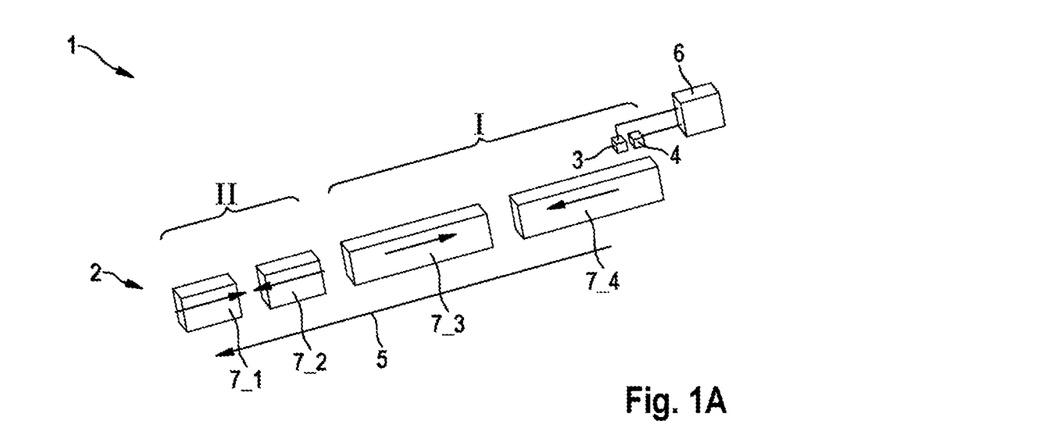
FIGS. 1A and 1B show a first exemplary embodiment of an advantageous path sensor.

FIG. 1A shows an advantageous path sensor 1 in a simplified perspective illustration, which path sensor detects the position or location of a measurement value transducer 2 in a non-contact manner with the aid of two sensor units 3, 4, wherein the measurement value transducer 2 is fixedly connected for example to an actuator element whose sliding position is to be monitored. The measurement value transducer 2 is mounted in a longitudinally displaceable fashion, as shown by an arrow 5. Furthermore, the measurement value transducer 2 has a property which is detectable by the sensor units 3, 4 and by means of which the position of the measurement value transducer 2 with respect to the sensor units 3, 4 is able to be ascertained. The sensor units 3, 4 are connected to an evaluation device 6, which determines the position of the measurement value transducer 2 depending on the output signals of the sensor units 3, 4.

In accordance with the present exemplary embodiment, provision is made for the measurement value transducer 2 to be configured as a magnetic measurement value transducer. For this purpose, the measurement value transducer 2 has a plurality of permanent magnets 7_1 to 7_4, which are arranged in succession as viewed in the direction of movement in accordance with arrow 5 and alternately have a different polarity, as shown by arrows. In this case, the permanent magnets 7_1 to 7_4 are arranged in such a way as to result in an incre-mentally rotating magnetic field. In this case, in accordance with the present exemplary embodiment, provision is made for the magnetic field to rotate in a plane lying in the displacement direction or parallel to the displacement direction in accordance with arrow 5.

The sensor units 3, 4 each have magnetic-field-sensitive sensors configured as Hall sensors or as XMR (AMR, GMR or TMR) sensors, for example, which detect magnetic field components acting in a predetermined direction. The sensor units 3, 4 are configured, in particular, to detect the magnetic field of the measurement value transducer 2 and to ascertain the position at which the measurement value transducer 2 is situated on the basis of the magnetic field components which rotate with the magnetic field.

In the present case there are two magnet pole pairs 7_1, 7_2 and 7_3 and 7_4, such that upon a movement of the measurement value transducer 2 from its initial position to its end position in accordance with arrow 5, twice the passage through a magnetic angle of 360° is detectable by the sensor units 3, 4. The sensor units 3, 4 thus detect the same property values of the property (magnetic field orientation) of the measurement value transducer twice. In order to ensure that an unambiguous position determination is nevertheless possible, the measurement value transducer 2 has two sections I and II formed by the permanent magnets 7_1 to 7_4, within which sections the change in the magnetic orientation has a different gradient.

This is achieved in the present case by virtue of the fact that the first magnet pole pair 7_1 and 7_2 is configured to be longer in the displacement direction than the second magnet pole pair 7_3 and 7_4. Thus, given a uniform speed of movement of the measurement value transducer 2, the magnetic field rotates more slowly in the first section I than in the second section II.

Figure 1B:
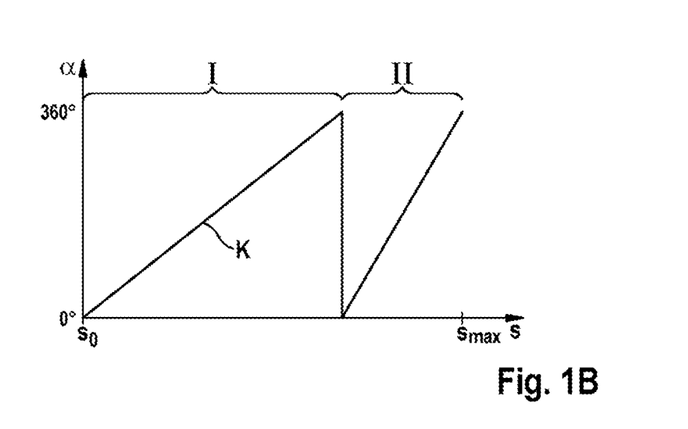

In this respect, FIG. 1B shows in a diagram the characteristic curve K over the path distance from the initial position $s_0$ to the maximum end position $s_{max}$, said characteristic curve resulting from the path sensor 1 and being detected by the sensor units 3, 4; in this case, the magnetic angle from 0° to 360° is passed through twice. It is evident that in the first section I the rotation of the magnetic field takes place more slowly, relative to the path distance, than in the section II.

The evaluation device 6, which evaluates the property values of the measurement value transducer 2 that are ascertained by the sensor units 3, 4, ascertains the gradient of the characteristic curve K depending on the property values of the sensor units 3, 4. This is possible by means of a simple conversion on account of the arrangement of the sensor units 3, 4 in succession in the direction of movement. In the present case, the evaluation device 6 identifies a smaller gradient in the first section I than in the second section II. Taking into account the currently present gradient and the detected property values, an unambiguous determination of the position of the measurement value transducer 2 is thus ensured because the respectively detected property value is assignable to one of the gradients and thus to one of the sections of the measurement value transducer 2.

While only two sections I and II having different gradients are present in accordance with the present exemplary embodiment, the number of sections having different gradients that is provided can be any desired number, in principle.

In particular, the gradient is determined for example by means of a comparison of the property values detected by the two sensor units 3, 4. On account of the spaced-apart arrangement of the sensor units 3, 4 in succession in the direction of movement, the gradient is able to be ascertained using a simple calculation.

Figure 2A:
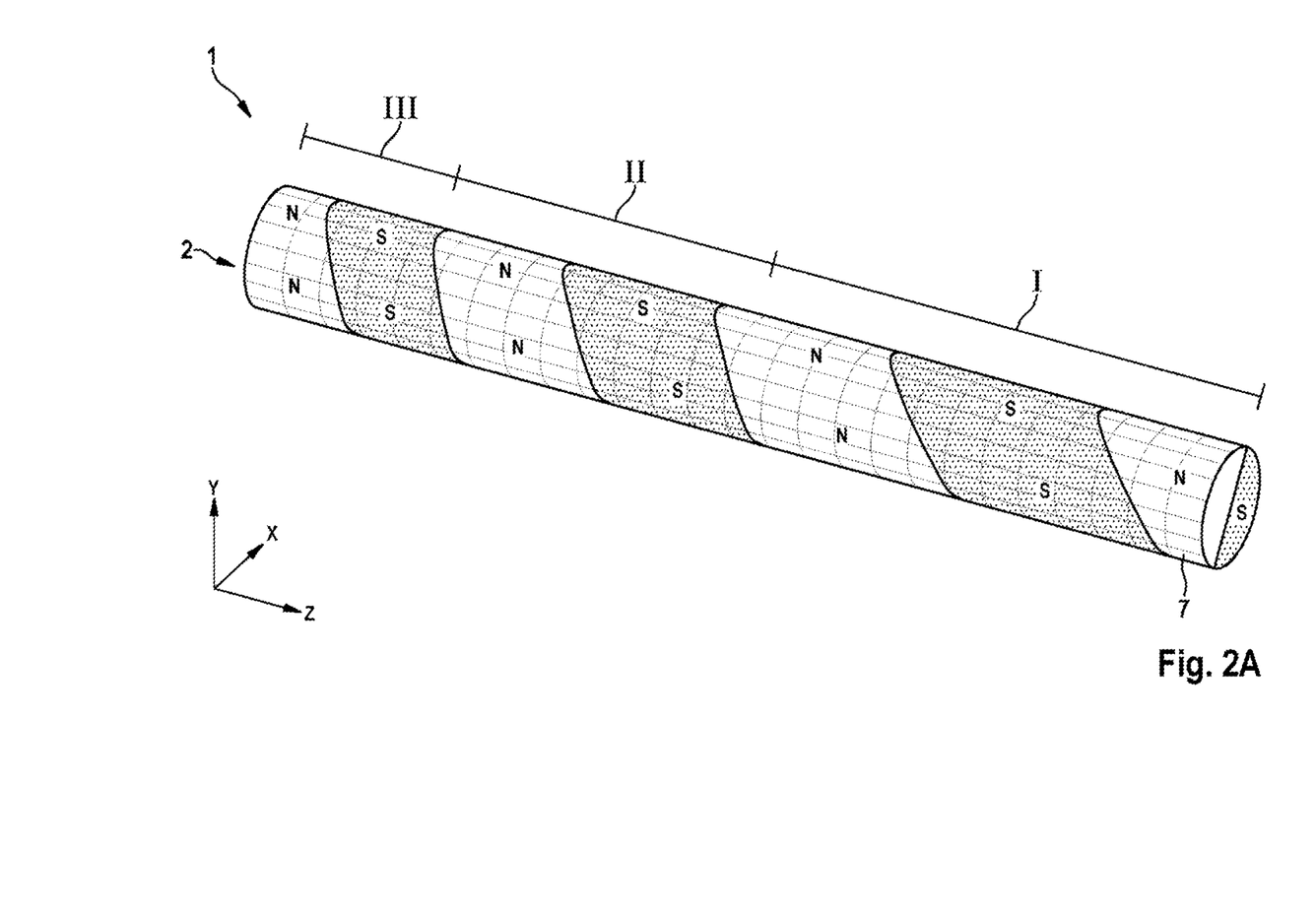
FIGS. 2A to 2C show a second exemplary embodiment of the advantageous path sensor.

FIG. 2A shows a second exemplary embodiment of the path sensor 1, wherein elements already known from the preceding exemplary embodiment are provided with the same reference signs and, in this respect, reference is made to the above description. Essentially only the differences will be discussed below.

Figure 2B:
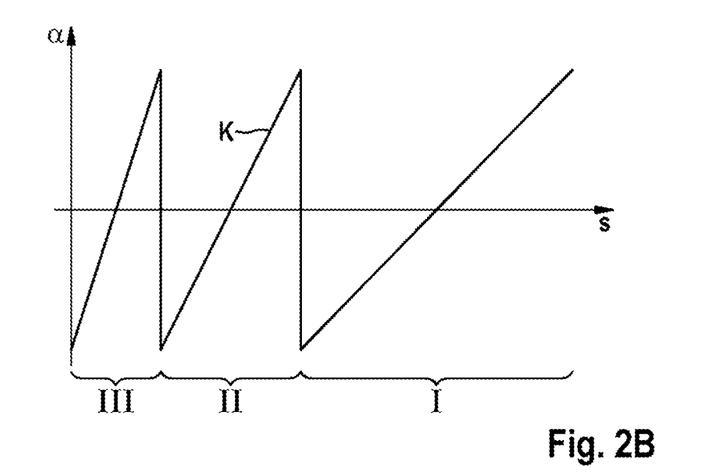

In contrast to the preceding exemplary embodiment, in accordance with the second exemplary embodiment, provision is primarily made for the path sensor 1 not to have a plurality of permanent magnets 7_1 to 7_2, but rather a single permanent magnet 7, which was magnetized helically. This results in a magnetic field of the measurement value transducer 2 which rotates not only in a plane parallel to the sliding direction but now also in a plane perpendicular to the displacement direction. In that case, in accordance with the present exemplary embodiment, too, there are different gradients during the rotation of the magnetic field, that is to say the rotation of the magnetic field orientation as property of the measurement value transducer 2. In the present case, the permanent magnet 7 has three sections I, II and III, within which the magnetic field rotation takes place at different speeds, relative to the displacement path. In a manner similar to that in the case of the first exemplary embodiment, this is achieved by virtue of the fact that the pole sections of the permanent magnet 7 are longer in the first section I than in the second section II, and are longer in the second section II than in the third section III. This results in the characteristic curve having different gradients in the sections I, II and III as shown in FIG. 2B.

While only two sections I and II having different gradients are present in accordance with the exemplary embodiment in FIG. 1, in accordance with the second exemplary embodiment the number of sections having different gradients that is provided can be any desired number. In accordance with one particularly preferred embodiment, at least one of the sections, which can lie at the end or else between two adjacent sections having different gradients, has a gradient of zero or no gradient, with the result that the property value of the measurement value transducer 2 does not change in this section. As a result, a so-called clamping section or clamping region is made available, within which the sensor signal does not change during movement of the measurement value transducer 2.

Figure 2C:
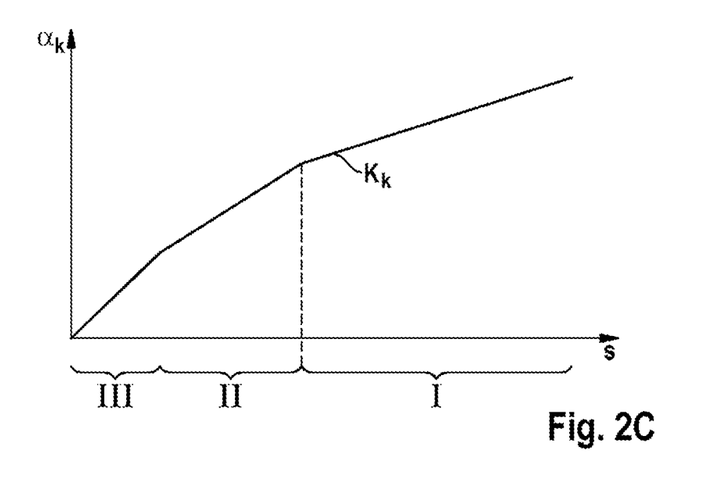

FIG. 2C shows a cumulated characteristic curve in which the gradients are plotted and concomitantly taken into account in a common characteristic curve. The characteristic curve thus present is unambiguous for the position of the measurement value transducer 2 relative to the sensor units 3, 4, with the result that the exact position of the measurement value transducer 2 is unambiguously determinable by simply reading the characteristic curve. Measurements over magnetic angels of 360° are thus advantageously made possible.

In order to reduce the influence of external disturbance fields, provision is preferably made, in addition, for the sensor units 3, 4 to detect at least one identical measurement variable in order to computationally extract the influence of the external disturbance field by means of difference value formation. If this is not necessary, an absolute measurement can also be carried out, in the case of which difference value formation is dispensed with.

Figure 3A:
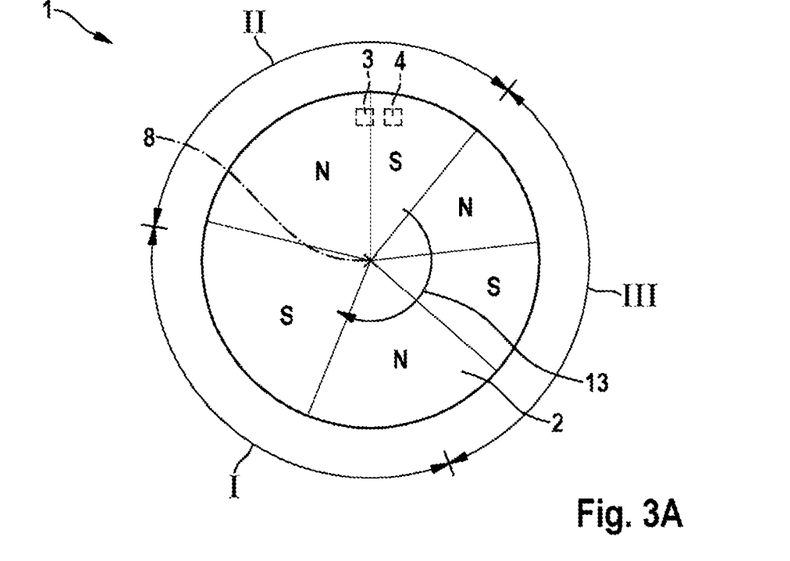
FIGS. 3A and 3B show a third exemplary embodiment of the advantageous path sensor.
Figure 3B:
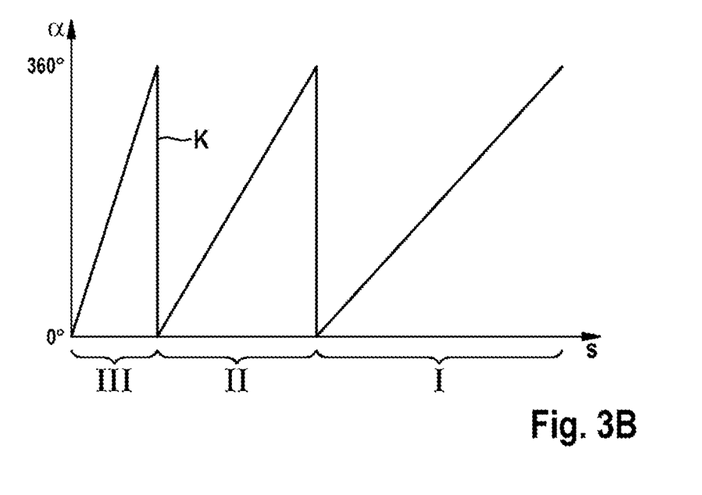

FIG. 3A shows a third exemplary embodiment of the path sensor 1. In contrast to the previous exemplary embodiments, provision is now made for the measurement value transducer 2 not to be mounted displaceably, but rather rotatably about a rotation axis 8, as shown by an arrow 12. As viewed in the direction of movement, that is to say in the circumferential direction in accordance with the present exemplary embodiment, the measurement value transducer 2 once again has the three sections I, II and III, which result from magnet pole pairs or magnet poles N, S extending to different extents over the movement path. By this means, too, when passing through the respective section I, II and III, a characteristic curve arises, as shown in FIG. 3B. The latter at least substantially corresponds to the characteristic curve from FIG. 2B. Consequently, the same sensor accuracy and possibility are also afforded in the case of a rotating measurement value transducer 2. Here, too, this characteristic curve K can be combined to form a cumulated characteristic curve. It is discernible in FIG. 3B that different gradients of the characteristic curve arise on account of the differently fashioned sections I, II and III, which gradients can be taken into account for determining the rotation angle position of the measurement value transducer 2. An unambiguous position determination thus results depending on the gradient and the currently detected property values.

In the case of the third exemplary embodiment, the sensor units 3, 4 are preferably situated in a plane above the drawing, as shown by dashed lines in FIG. 3A. As a result of the advantageous configuration, in the present case, by way of example, it is possible to create sections or regions of the measurement value transducer 2 which offer a different sensitivity during the measurement or the position determination. Even without having to move the measurement value transducer 2 into a known initial position, by means of a simple measurement the current position of the measurement value transducer 2 is ensured owing to the gradient being taken into account.

Figure 4:
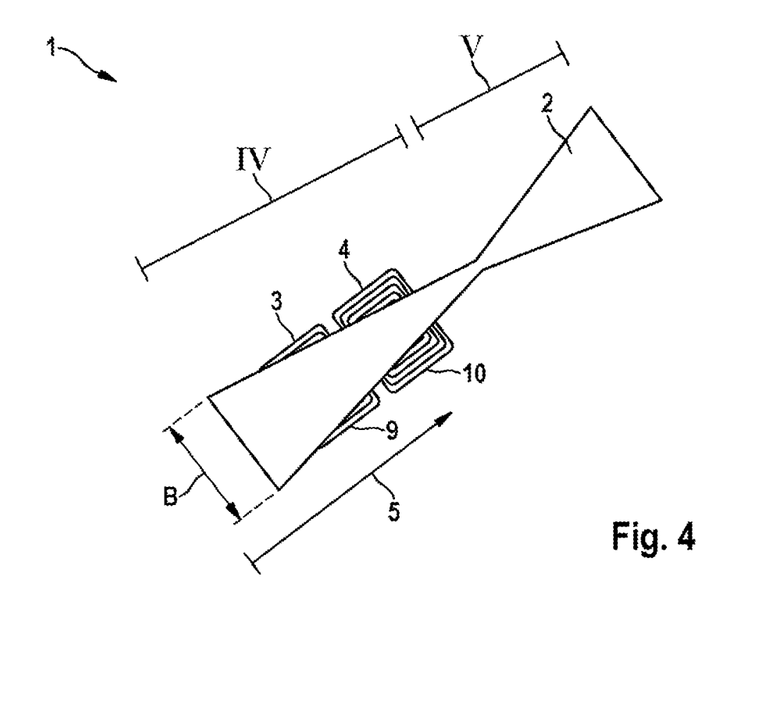
FIG. 4 shows a fourth exemplary embodiment of the advantageous path sensor.

FIG. 4 shows a fourth exemplary embodiment of the path sensor 1, which differs from the previous exemplary embodiments in that the sensor units 3, 4 do not detect a magnetic field, but rather, as inductive sensors, each have an induction coil 9, 10, which are arranged in succession in the direction of movement of the measurement value transducer 2. In the case of the present path sensor 1, the measurement value transducer 2, as described in the first two exemplary embodiments, is mounted in a linearly displaceable fashion and has a width B that changes over its longitudinal extent or in the direction of movement in accordance with arrow 5. As a result of the degree of coverage of the induction coil 9, 10, the measurement value transducer 2 changes the inductance thereof, which is then detected and evaluated. In the case of the exemplary embodiment in accordance with FIG. 4, a characteristic curve results which falls in a first section IV and rises in a subsequent second section V. As a result of the use of the second induction coil 10, the position of the measurement value transducer 2 is now able to be established unambiguously by the gradient of the characteristic curve being taken into account. In this case, a plurality of sections having different absolute values of the gradient can also be added one after another. In particular, FIG. 4 shows two sections having gradients which have opposite signs, thereby affording advantages in the evaluation. While the path sensor 1 is configured as a linear path sensor in accordance with the present exemplary embodiment, the measurement value transducer structure 2 can also be applied or wound onto the outer circumference or circumference of a rotating measurement value transducer 2, as shown in FIG. 3A, for example. If the sensor units 3, 4 are then assigned to the circumference of the rotating measurement value transducer 2, an unambiguous position determination is possible here, too.

Figure 5:
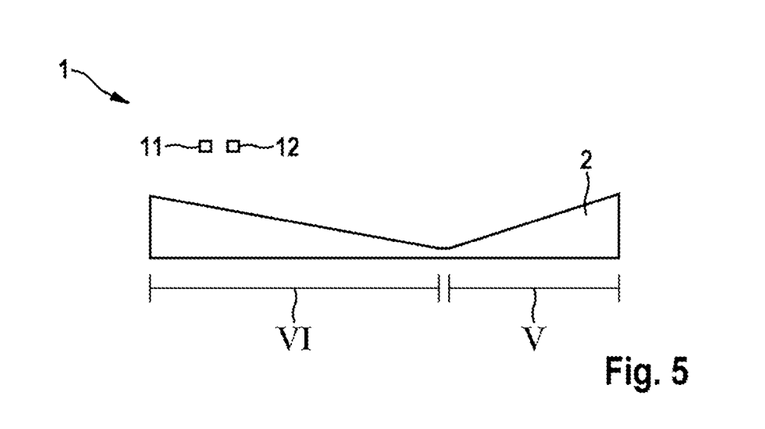
FIG. 5 shows a fifth exemplary embodiment of the advantageous path sensor.

FIG. 5 shows a further exemplary embodiment of the path sensor 1, which differs from the preceding exemplary embodiment in FIG. 4 in that the measurement value transducer 2 is produced from metallic material and the sensor units 3, 4 have capacitive sensors 11 and 12. As a result of the different gradients in the sections IV and V, which are oriented oppositely as in the exemplary embodiment in FIG. 4, an unambiguous position determination, as described above, is ensured. This concept, too, in the manner described above, can be applied to a rotation angle sensor having a rotatably mounted measurement value transducer 2 or main body for a measurement value transducer.

What the present exemplary embodiments have in common is that an unambiguous position determination or an unambiguous output variable of the path sensor 1 is ensured by the evaluation of the gradient of the characteristic curve and from the information of the detected property values. Various measurement principles are conceivable here.

In accordance with a first measurement principle, as already explained above, an absolute measurement is carried out. The two sensor units carry out measurement along the length of the path on which the measurement value transducer is moved. Consequently, the difference between their output signals (given a known distance between the measuring sensors or sensor units 3, 4 and the measurement value transducer 2) corresponds directly to the gradient of the characteristic curve. Property value and gradient of the same characteristic curve can thus be used to obtain an unambiguous position assignment.

A second possibility consists in using two sensor units 3, 4 that are not fitted exactly along the displacement path. Consequently, the difference between their output signals (given a known distance of the measuring sensors) is at least similar to the gradient of the characteristic curve, referred to hereinafter as pseudo-gradient. Property value and pseudo-gradient can thus be used to make possible an unambiguous position determination. The measuring points or the sensor units 3, 4 thus do not have to be arranged very accurately one after the another in the displacement direction, but rather can for example also be situated in a manner offset sideward with respect to one another.

A third possibility consists in applying a differential measurement principle, as already indicated above. Thus, differential measurement is carried out in each case at two locations along the displacement path. The sensor units 3, 4 arranged at a distance from one another in the displacement direction are necessary for this purpose. Ultimately at least three measurement value sensors are required for these embodiments; one measurement value sensor can be used doubly, in principle. The difference between the differential output signals (given a known distance between the measuring sensors or sensor units 3, 4 and the measurement value transducer 2) corresponds directly to the gradient of the characteristic curve. The property value and gradient of the same characteristic curve can thus be used to obtain an unambiguous position assignment. Since a purely differential measurement principle is involved, it is insensitive to external, homogeneous disturbances. What is important here is that a measurement variable from which difference value formation is made possible is detected by both sensor units 3, 4. Preferably, the sensor units respectively ascertain two identical measurement variables in order to obtain property values which are comparable with one another and which are made robust vis-à-vis external control fields by means of differential measurement.

In accordance with a fourth possibility, provision is made for carrying out differential measurement in a manner similar to that in the case of the third possibility, although the sensor units 3, 4 are not situated exactly along the path, but rather for example in a manner offset laterally with respect to one another, such that a pseudo-gradient, as already explained above, is ascertained and used for the determination of the position of the measurement value transducer 2. As a result of the differential measurement principle, the robustness vis-à-vis external disturbances is increased in this case.

In accordance with a fifth possibility, a differential and an absolute measurement principle are combined: the primary output signal is a differential signal generated differentially by two measurement value sensors or sensor units 3, 4 at two locations, as described above. In addition, the absolute measurement principle is applied in the case of two measurement value sensors/sensor units 3, 4. The gradient of a second characteristic curve is obtained from the difference between these signals obtained in an absolute fashion. In this case, preferably, the property value of the differential measurement is then compared or combined with the gradient of the absolute measurement in order to ensure an unambiguous position determination. In this case, it is also possible to achieve external field robustness if the differential angle signal is used as primary position information and the absolute signal is changed as a result of the influence of a maximally specified external field only to such a slight extent that an assignment of the gradient still remains unambiguous.

The invention claimed is:

1. A path sensor, comprising:
a measurement value transducer;
at least two sensor units assigned to the measurement value transducer, wherein the measurement value transducer is displaceable relative to the at least two sensor units in a direction of movement and has a property which changes at least once from an initial value to an end value along the measurement value transducer, and the at least two sensor units being configured to detect property values of the property; and
an evaluation device configured to determine the position of the measurement value transducer relative to the at least two sensor units based on the property values detected by the at least two sensor units,
wherein:
the measurement value transducer has at least two sections in succession in the direction of movement, and the property changes along each section of the at least two sections from at least a starting value to at least an end value, wherein the property change has different gradients in the at least two sections;
the at least two sensor units each have at least one induction coil, and
the measurement value transducer is metallically configured and the property is a width of the measurement value transducer that changes in the direction of movement.

2. The path sensor as claimed in claim 1, wherein at least two of the at least two sections have at least one of equal starting values of the property and equal end values of the property.

3. The path sensor as claimed in claim 1, wherein the measurement value transducer includes at least one further section situated in the direction of movement and in which the property does not change in the direction of movement.

4. The path sensor as claimed in claim 1, wherein the at least two sensor units are arranged in succession as viewed in the direction of movement of the measurement value transducer.

5. The path sensor as claimed in claim 1, wherein the measurement value transducer is mounted displaceably.

6. The path sensor as claimed in claim 1, wherein the measurement value transducer is mounted rotatably.

7. A path sensor, comprising:
a measurement value transducer;
at least two sensor units assigned to the measurement value transducer, wherein the measurement value transducer is displaceable relative to the at least two sensor units in a direction of movement and has a property which changes at least once from an initial value to an end value along the measurement value transducer, and the at least two sensor units being configured to detect property values of the property; and
an evaluation device configured to determine the position of the measurement value transducer relative to the at least two sensor units based on the property values detected by the at least two sensor units,
wherein:
the measurement value transducer has at least two sections in succession in the direction of movement, and the property changes along each section of the at least two sections from at least a starting value to at least an end value, wherein the property change has different gradients in the at least two sections;
the at least two sensor units are configured as capacitive sensors, and
the measurement value transducer is metallically configured and the property is a width of the measurement value transducer that changes in the direction of movement.

8. A method for operating a path sensor, comprising:
detecting, with at least two sensor units assigned to a measurement value transducer, property values of a property which changes at least once from a starting value to an end value along a direction of movement of the measurement value transducer, the measurement value transducer being displaceable along the direction of movement, the measurement value transducer has at least two sections in succession in the direction of movement, the property changes along each section of the at least two sections from at least a starting value to at least an end value, the at least two sensor units each have at least one induction coil, the measurement value transducer is metallically configured, and the property is a width of the measurement value transducer that changes in the direction of movement; and
determining a position of the measurement value transducer in relation to the at least two sensor units based on the property values of the property detected by the sensor units;
wherein a gradient of the change in the property is ascertained by the sensor units, and
wherein, the position of the measurement value transducer is determined depending on the detected property values and the ascertained gradient.

9. A method for operating a path sensor including a measurement value transducer and at least two sensor units assigned to the measurement value transducer, the at least two sensor units displaced with respect to each other and configured to detect property values of a property which changes at least once from a starting value to an end value along the path, comprising:
displacing the measurement value transducer relative to the at least two sensor units along the path, the measurement value transducer having at least two sections in succession in the direction of movement wherein the property is a magnetic field orientation which changes along each section of the at least two sections from at least a starting value to at least an end value, wherein the magnetic field orientation has different gradients in the at least two sections;
detecting, with the at least two sensor units configured as Hall or XMR magnetic field-sensitive sensors, a plurality of property values of the property as the measurement value transducer is displaced along the path;
determining a first slope of a change in the detected plurality of property values, as detected by a first sensor of the at least two sensors, resulting from the displacement of the measurement value transducer along the path;

determining a second slope of a change in the detected plurality of property values, as detected by a second sensor of the at least two sensors, resulting from the displacement of the measurement value transducer along the path; and determining the position of the measurement value transducer absolutely using the determined first and second slopes and a difference between a first of the plurality of property values detected by the first sensor and a second of the plurality of property values detected by the second sensor.

* * * * *